United States Patent
Hsu et al.

(10) Patent No.: US 11,284,077 B2
(45) Date of Patent: Mar. 22, 2022

(54) SIGNALING OF SUBPICTURE STRUCTURES

(71) Applicant: MediaTek Inc., Hsinchu (TW)

(72) Inventors: Chih-Wei Hsu, Hsinchu (TW); Lulin Chen, San Jose, CA (US); Yu-Wen Huang, Hsinchu (TW)

(*) Notice: Subject to any disclaimer, the term of this patent is extended or adjusted under 35 U.S.C. 154(b) by 0 days.

(21) Appl. No.: 17/016,257

(22) Filed: Sep. 9, 2020

(65) Prior Publication Data

US 2021/0076035 A1  Mar. 11, 2021

Related U.S. Application Data

(60) Provisional application No. 62/898,127, filed on Sep. 10, 2019.

(51) Int. Cl.
| | |
|---|---|
| *H04N 19/119* | (2014.01) |
| *H04N 19/176* | (2014.01) |
| *H04N 19/169* | (2014.01) |
| *H04N 19/70* | (2014.01) |

(52) U.S. Cl.
CPC ......... *H04N 19/119* (2014.11); *H04N 19/176* (2014.11); *H04N 19/1883* (2014.11); *H04N 19/70* (2014.11)

(58) Field of Classification Search
CPC .............. H04N 19/119; H04N 19/176; H04N 19/1883; H04N 19/70
See application file for complete search history.

(56) References Cited

U.S. PATENT DOCUMENTS

| | | | | |
|---|---|---|---|---|
| 2015/0146780 A1* | 5/2015 | Miyoshi | ............... | H04N 19/174 |
| | | | | 375/240.12 |
| 2016/0219276 A1* | 7/2016 | Li | ......................... | H04N 19/196 |
| 2018/0160118 A1* | 6/2018 | Tsukuba | ............... | H04N 19/119 |
| 2021/0136407 A1* | 5/2021 | Aono | ..................... | H04N 19/55 |

OTHER PUBLICATIONS

Taiwan Intellectual Property Office, Office Action for Taiwan Patent Application No. 109131117, dated Jul. 20, 2021.
Intel, Sub-pictures and sub-picture sets with level derivation, Joint Video Experts Team (JVET) of ITU-T SG 16 WP 3 and ISO/IEC JTC 1/SC 29/WG 11, JVET-O0555-v1, 15th Meeting, Gothenburg, Sweden, Jul. 3-12, 2019.

* cited by examiner

*Primary Examiner* — Jonathan R Messmore
(74) *Attorney, Agent, or Firm* — Han IP PLLC; Andy M. Han

(57) ABSTRACT

A method for signaling subpicture structures for coded video is provided. A video decoder receives data from a bitstream to be decoded as a sequence of video pictures. The video decoder receives from the bitstream subpicture specification for one or more subpictures in the sequence of video pictures. The subpicture specification identifies a position and a size for each subpicture by providing an index that identifies a coding tree unit (CTU) for the subpicture. The video decoder reconstructs each subpicture for the sequence of video pictures according to the subpicture specification.

11 Claims, 9 Drawing Sheets

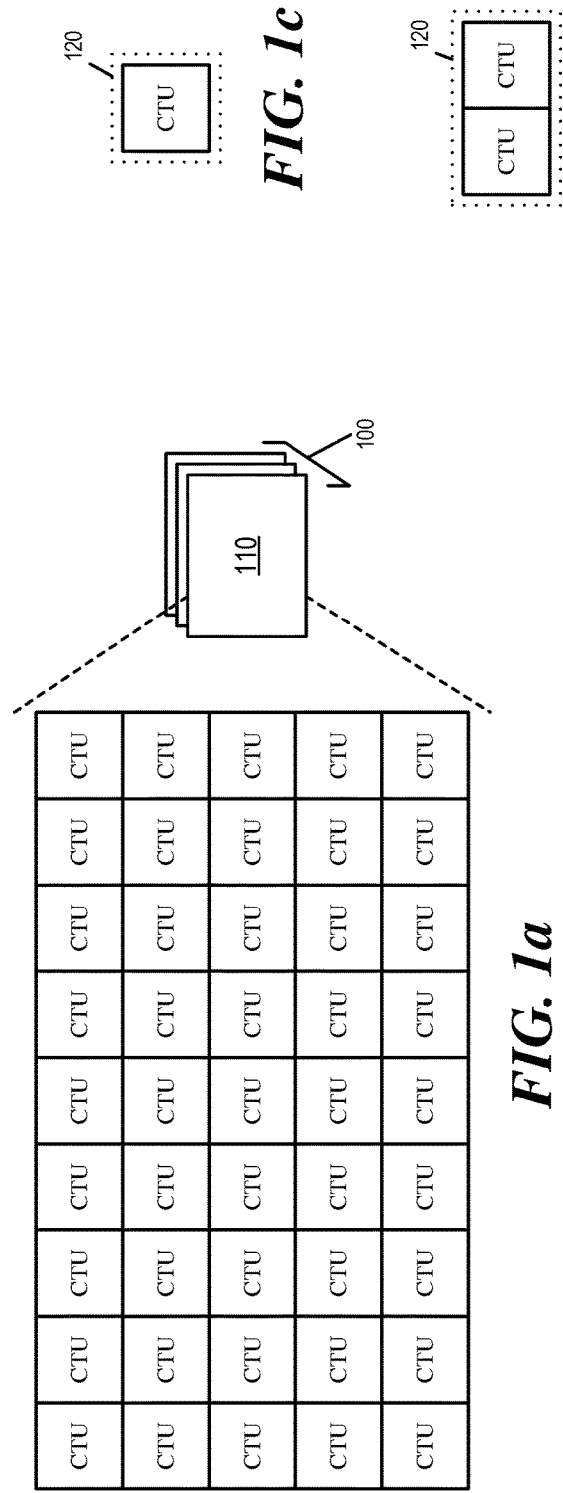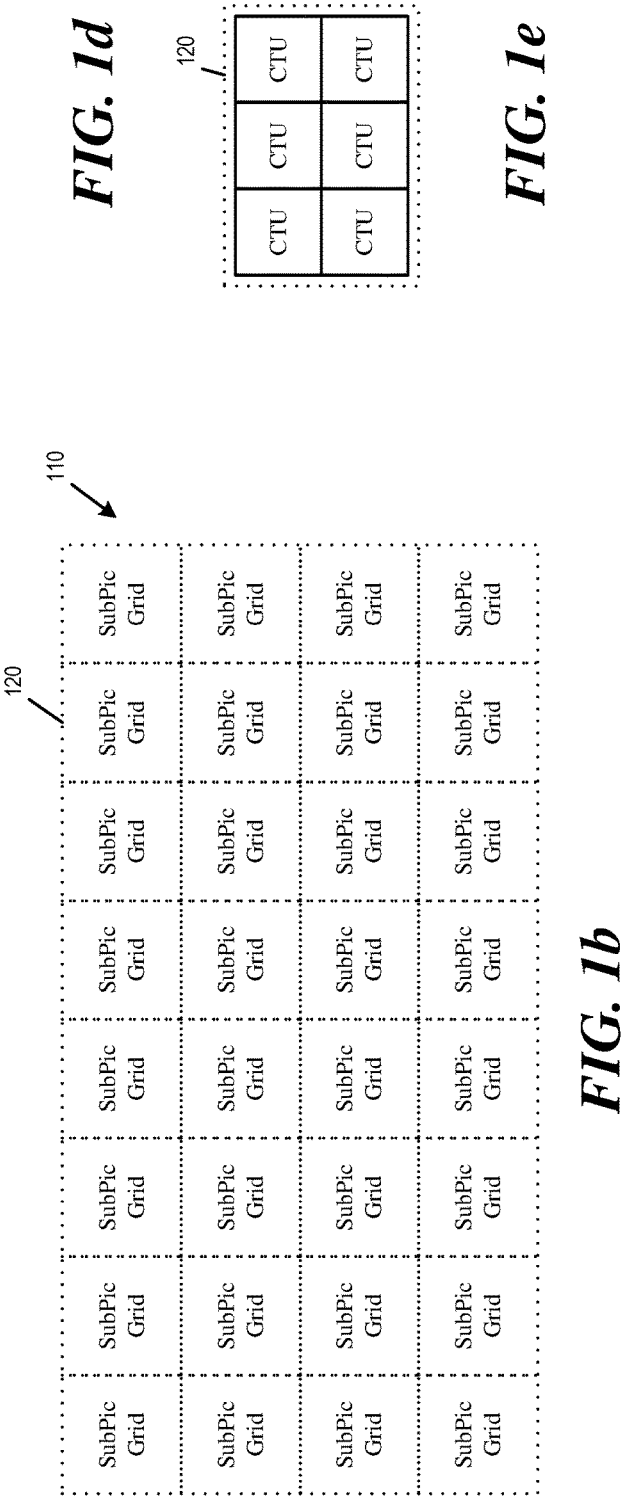

FIG. 2

SIGNALING OF SUBPICTURE STRUCTURES

CROSS REFERENCE TO RELATED PATENT APPLICATION(S)

The present disclosure is part of a non-provisional application that claims the priority benefit of U.S. Provisional Patent Applications No. 62/898,127 and No. 62/898,620, filed on 10 Sep. 2019 and 11 Sep. 2019, respectively. Contents of above-listed applications are herein incorporated by reference.

TECHNICAL FIELD

The present disclosure relates generally to video coding. In particular, the present disclosure relates to methods of signaling subpicture structures.

BACKGROUND

Unless otherwise indicated herein, approaches described in this section are not prior art to the claims listed below and are not admitted as prior art by inclusion in this section.

High-efficiency video coding (HEVC) is the latest international video coding standard developed by the Joint Collaborative Team on Video Coding (JCT-VC). The input video signal is predicted from the reconstructed signal, which is derived from the coded picture regions. The prediction residual signal is processed by a linear transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. A CTU may also be partitioned into one or multiple smaller size CUs by a quadtree with nested multi-type tree using binary and ternary split. The resulting CU partitions can be in square or rectangular shapes.

One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide a method for signaling subpicture structures for coded video. A video decoder receives data from a bitstream to be decoded as a sequence of video pictures. The video decoder receives from the bitstream subpicture specification for one or more subpictures in the sequence of video pictures. The subpicture specification identifies a position and a size for each subpicture by providing an index that identifies a coding tree unit (CTU) in the order of raster scan within a picture for the subpicture. The video decoder reconstructs each subpicture for the sequence of video pictures according to the subpicture specification.

In some embodiments, a syntax element in a sequence parameter set (SPS) of the sequence of video pictures indicates that one or more subpicture is present in the sequence of video pictures. The SPS may also include a syntax element that specifies the number of subpictures of the sequence of video pictures, as well as an identifier for each subpicture. Identifiers of subpictures may also be signaled in slice headers and/or picture parameter sets (PPSs) of video pictures in the sequence of video pictures. In some embodiments, a syntax element in the PPS of a video picture in the sequence of video picture indicates that all slices of the video picture are rectangular.

In some embodiments, the identified CTU in raster scan within a picture is at a corner (e.g., top-left or bottom-right) of the subpicture. In some embodiments, the index is assigned to a subpicture grid in raster scan within a picture, and different subpicture grids are assigned different indices. In some embodiments, the index identifies a subpicture grid that is defined to be one CTU or correspond to one CTU, such that the boundaries of the subpicture grids are defined along boundaries of CTUs. In some embodiments, the indices of subpicture positions and sizes are signaled in a SPS of the sequence of video pictures.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIGS. 1a-e conceptually illustrate CTB or CTU based grid units being used to specify subpictures of a video sequence.

FIG. 2 illustrates CTU or CTB-based subpicture grids that are indexed in the order of raster scan within a picture for specifying subpictures.

DETAILED DESCRIPTION

Figure 3:
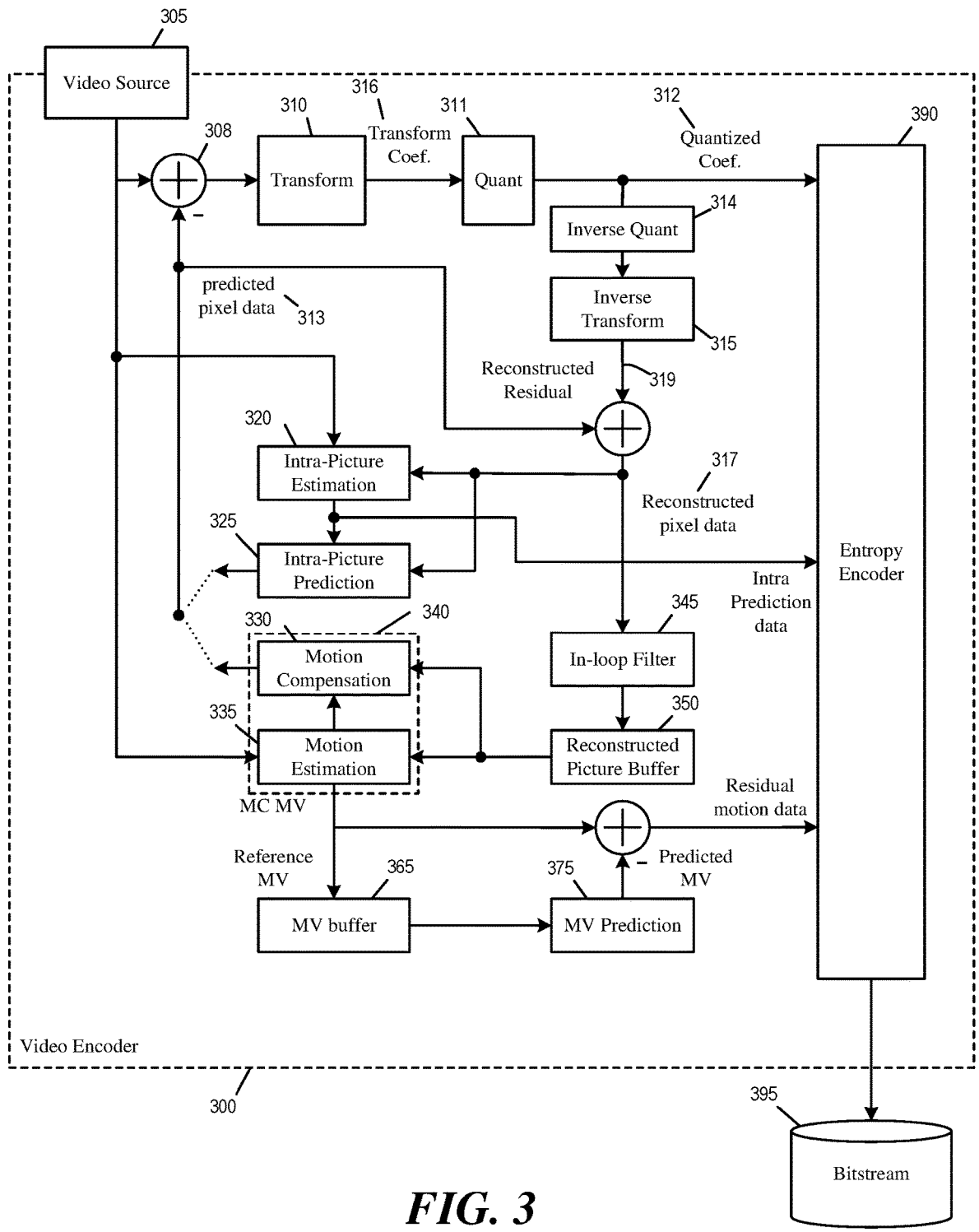
FIG. 3 illustrates an example video encoder that support subpictures.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Signaling Subpicture Structures

A subpicture is a rectangular region of one or more slices within a picture and a slice consists of one or more tiles/bricks. Each tile/brick is CTU aligned. When subpictures are present in a picture, the number of the subpictures may be greater than or equal to 2. Slices forming a subpicture may be rectangular. In some embodiments, grid in units of CTBs is used to specify subpicture structures within a picture by indicating the bottom-right subpicture grid index in the order of raster scan within a picture for each subpicture.

In some embodiments, a video encoder may signal the specification of a subpicture (and a video decoder may receive the specification of the subpicture). Table 1A below is an example syntax table for sequence parameter set (SPS) raw byte sequence payload (RBSP) that signal subpicture information:

TABLE 1A

| SPS signaling subpicture information | |
|---|---|
|  | Descriptor |
| seq_parameter_set_rbsp( ) { |  |
|   sps_decoding_parameter_set_id | u(4) |
|   sps_video_parameter_set_id | u(4) |

TABLE 1A-continued

| SPS signaling subpicture information | |
|---|---|
|  | Descriptor |
|   sps_max_sub_layers_minus1 | u(3) |
|   sps_reserved_zero_5bits | u(5) |
|   profile_tier_level( sps_max_sub_layers_minus1 ) |  |
|   gdr_enabled_flag | u(1) |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { |  |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) |  |
|       for( j = 0; j < NumSubPicGridCols; j++ ) |  |
|         subpic_grid_idx[ i ][ j ] | u(v) |
|     for( i = 0; i <= NumSubPics; i++ ) { |  |
|       subpic_treated_as_pic_flag[ i ] | u(1) |
|       loop_filter_across_subpic_enabled_flag[ i ] | u(1) |
|     } |  |
|   } |  |
|   bit_depth_luma_minus8 | ue(v) |
|   bit_depth_chroma_minus8 | ue(v) |
|   ... |  |
|   sps_extension_flag | u(1) |
|   if( sps_extension_flag ) |  |
|     while( more_rbsp_data( )) |  |
|       sps_extension_data_flag | u(1) |
|   rbsp_trailing_bits( ) |  |
| } |  |

Table 1B below is another example syntax table for sequence parameter set (SPS) raw byte sequence payload (RBSP) that provide specification of a subpicture:

TABLE 1B

| SPS specifying Subpicture | |
|---|---|
|  | Descriptor |
| seq_parameter_set_rbsp( ) { |  |
|   sps_decoding_parameter_set_id | u(4) |
|   sps_video_parameter_set_id | u(4) |
|   ... |  |
|   subpics_present_flag | u(1) |
|   if( subpics_present_flag ) { |  |
|     max_subpics_minus2 | u(8) |
|     subpic_grid_col_width_minus1 | u(v) |
|     subpic_grid_row_height_minus1 | u(v) |
|     for( i = 0; i < NumSubPicGridRows; i++ ) |  |
|       for( j = 0; j < NumSubPicGridCols; j++ ) |  |
|         subpic_grid_idx[ i ][ j ] | u(v) |
|     for( i = 0; i <= NumSubPics; i++ ) { |  |
|       subpic_treated_as_pic_flag[ i ] | u(1) |
|       loop_filter_across_subpic_enabled_flag[ i ] | u(1) |
|     } |  |
|   } |  |
|   bit_depth_luma_minus8 | ue(v) |
|   bit_depth_chroma_minus8 | ue(v) |
|   ... |  |
|   sps_extension_flag | u(1) |
|   if( sps_extension_flag ) |  |
|     while( more_rbsp_data( )) |  |
|       sps_extension_data_flag | u(1) |
|   rbsp_trailing_bits( ) |  |
| } |  |

Table 1C below is another example syntax table for sequence parameter set (SPS) raw byte sequence payload (RBSP) that provide specification of a subpicture:

TABLE 1C

| SPS specifying Subpicture | |
|---|---|
| | Descriptor |
| seq_parameter_set_rbsp( ) { | |
|   sps_decoding_parameter_set_id | u(4) |
|   sps_video_parameter_set_id | u(4) |
|   ... | |
|   subpics_present_flag | u(1) |
|   if( subpics_present_flag ) { | |
|     num_subpics_minus2 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
|   ... | |
|   sps_extension_flag | u(1) |
|   if( sps_extension_flag) | |
|     while( more_rbsp_data( )) | |
|       sps_extension_data_flag | u(1) |
|   rbsp_trailing_bits( ) | |
| } | |

Table 1D below is another example syntax table for sequence parameter set (SPS) raw byte sequence payload (RBSP) that provide specification of a subpicture:

TABLE 1D

| SPS specifying Subpicture | |
|---|---|
| | Descriptor |
| Seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   log2_ctu_size_minus5 | u(2) |
|   subpics_present_flag | u(1) |
|   if( subpics_present_flag ) { | |
|     num_subpics_minus1 | u(8) |
|   signalled_subpic_grid_flag | u(1) |
|   if( signalled_subpic_grid_flag ) { | |
|     subpic_grid_col_width_minus1 | u(v) |
|     subpic_grid_row_height_minus1 | u(v) |
|   } | |
|   else { | |
|     subpic_grid_col_width_minus1 = 0 | |
|     subpic_grid_row_height_minus1 = 0 | |
|   } | |
|   bottom_right_subpic_grid_idx_length_minus1 | u(v) |
|   for( i = 0; i < num_subpics_minus1; i++ ) { | |
|     bottom_right_subpic_grid_idx_delta[ i ] | u(v) |
|   if( i > 0 ) | |
|     subpic_grid_idx_delta_sign_flag[ i ] | u(1) |
|   } | |

TABLE 1D-continued

| SPS specifying Subpicture | |
|---|---|
| | Descriptor |
|   for( i = 0; i < num_subpics_minus1; i++ ) { | |
|     subpic_treated_as_pic_flag[ i ] | u(1) |
|     loop_filter_across_subpic_enabled_flag[ i ] | u(1) |
|   } | |
| } | |
| bit_depth_luma_minus8 | ue(v) |
| bit_depth_chroma_minus8 | ue(v) |
| ... | |
| sps_extension_flag | u(1) |
| if( sps_extension_flag ) | |
|   while( more_rbsp_data( )) | |
|     sps_extension_data_flag | u(1) |
| rbsp_trailing_bits( ) | |
| } | |

The syntax element subpics_present_flag being 1 indicates that subpicture parameters are present in the present in the SPS RBSP syntax. In some embodiments, when subpics_present_flag is equal to 1, the value of rect_slice_flag is set to 1. The syntax element subpics_present_flag being 0 indicates that subpicture parameters are not present in the present in the SPS RBSP syntax. In some embodiments, when a bitstream is the result of a sub-bitstream extraction process and contains only a subset of the subpictures of the input bitstream to the sub-bitstream extraction process, the value of subpics_present_flag may be set to 1 in the RBSP of the SPS.

The syntax element max_subpics_minus2 plus 2 specifies the maximum number of subpictures that may be present in a coded video sequence (CVS). In some embodiments, max_subpics_minus2 is constrained to be in the range of 0 to 254. The value of 255 is reserved for future use.

The syntax element num_subpics_minus1 plus 1 specifies the number of subpictures that may be present in a CVS. In some embodiments, the value of num_subpics_minus1 is constrained to be in the range of 0 to 254. The value of 255 is reserved for future use. As illustrated in Table 1 D, the number of subpictures present in a CVS is directly signaled in the SPS through the syntax element num_subpics_minus1.

The syntax element num_subpics_minus2 plus 2 specifies the number of subpictures that may be present in a CVS. In some embodiments, the value of num_subpics_minus2 is constrained to be in the range of 0 to 254. The value of 255 is reserved for future use.

The syntax element subpic_grid_col_width_minus1 plus 1 specifies the width of each element of the subpicture identifier grid, excluding the right-most grid column of the picture, in units of CtbSizeY. The length of the syntax element is Ceil(Log 2(pic_width_max_in_luma_samples/ CtbSizeY)) bits. When not present, subpic_grid_row_width_minus1 is inferred to be 0.

The syntax element subpic_grid_row_height_minus1 plus 1 specifies the height of each element of the subpicture identifier grid, excluding the bottom grid row of the picture, in units of CtbSizeY. The length of the syntax element is Ceil(Log 2(pic_height_max_in_luma_samples/CtbSizeY)) bits. When not present, subpic_grid_row_height_minus1 is inferred to be 0.

The variable NumSubPicGridRows is derived as follows:
  NumSubPicGridRows=(pic_height_max_in_luma_samples+
  subpic_grid_row_height_minus1*CtbSizeY+
  CtbSizeY−1)/
  (subpic_grid_row_height_minus1*CtbSizeY+
  CtbSizeY)

The syntax element bottom_right_subpic_grid_idx_length_minus1 plus 1 specifies the number of bits used to represent the syntax element bottom_right_subpic_grid_idx_delta[i]. The value of bottom_right_subpic_grid_idx_length_minus1 shall be in the range of 0 to Ceil(Log 2(NumSubPicGridRows*NumSubPicGridCols))−1, inclusive.

The variable bottom_right_subpic_grid_idx_delta[i] when i is greater than 0 specifies the difference between the subpicture grid index of the bottom-right corner of the i-th subpicture and the subpicture grid index of the bottom-right corner of the (i−1)-th subpicture. The variable bottom_right_subpic_grid_idx_delta[0] specifies the subpic grid index of the bottom right corner of the 0-th subpicture.

The syntax element subpic_grid_idx_delta_sign_flag[i] equal to 1 indicates a positive sign for bottom_right_subpic_grid_idx_delta[i]. sign_bottom_right_subpic_grid_idx_delta[i] equal to 0 indicates a negative sign for bottom_right_subpic_grid_idx_delta[i].

FIGS. 1a-e conceptually illustrate CTB or CTU based grid units being used to specify subpictures of a video sequence. FIG. 1a illustrates a video sequence (CVS) 100 that includes several video pictures. The video pictures in the sequence 100, such as a picture 110, are divided into CTUs. FIG. 1b illustrates the pictures of the sequence being divided into subpicture grids for specifying subpictures. Each subpicture grid 120 correspond to an integer number of CTUs such that each subpicture grid is defined based on boundaries of CTUs or CTBs. FIG. 1c illustrates an example in which each subpicture grid 120 correspond to exactly one CTU or CTB. FIG. 1d illustrates an example in which each subpicture grid 120 correspond to 2×1 CTUs or CTBs. FIG. 1e illustrates an example in which each subpicture grid 120 correspond to 2×3 CTUs or CTBs. In some embodiments, SPS syntax elements such as subpic_grid_col_width_minus1 and subpic_grid_row_height_minus1 defines the subpicture grids in terms of CTUs or CTBs. In addition, the size of each CTU or CTB is signaled in the SPS in a syntax element log 2_ctu_size_minus5.

Figure 2:
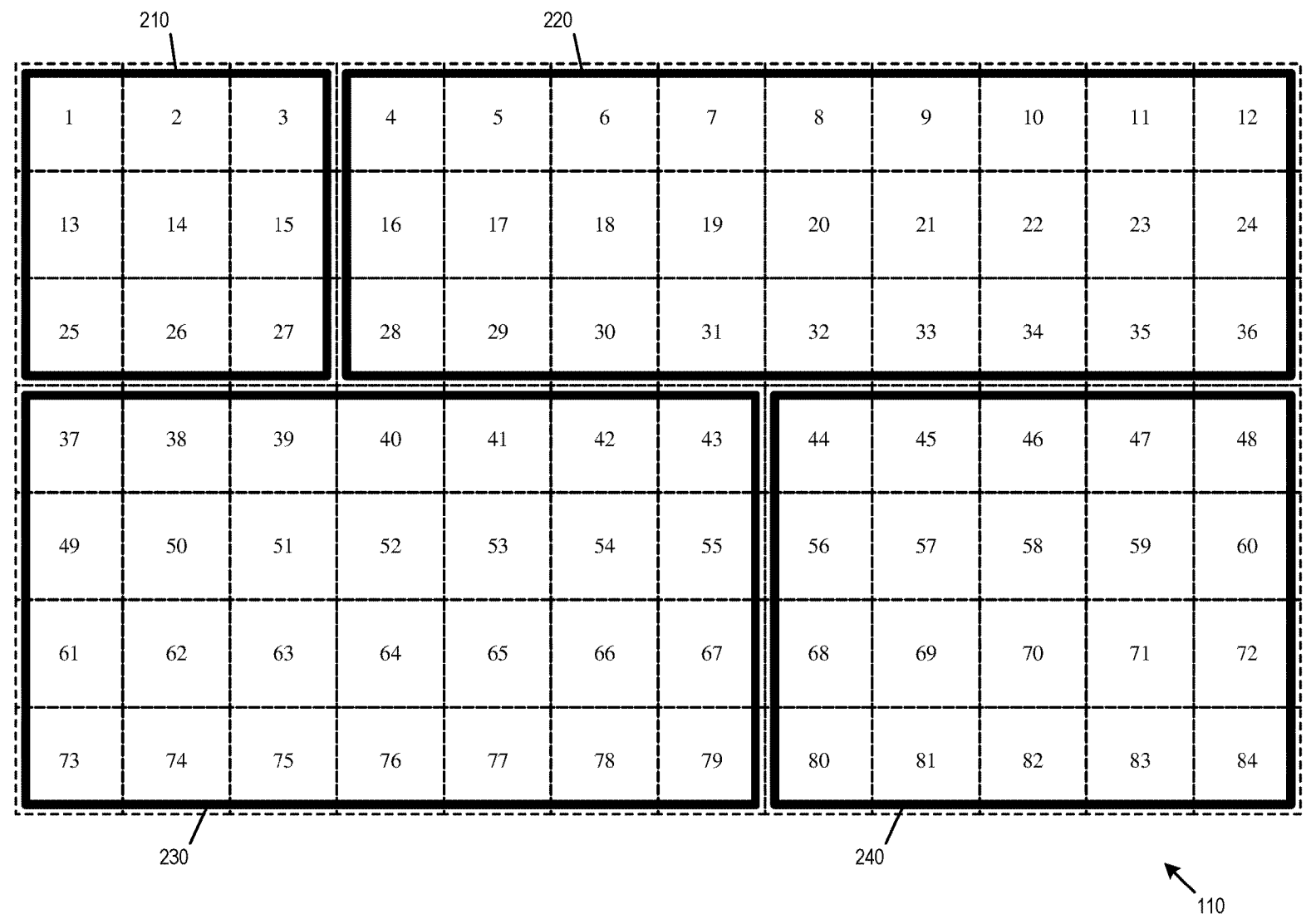

FIG. 2 illustrates CTU or CTB-based subpicture grids that are indexed for specifying subpictures. Each subpicture grid in the picture 110 corresponds to an index that can be used when a video codec is signaling the size (e.g., width, height) and/or position of a subpicture. The specified elements of the subpicture identifier grid are indexed in the order of ranster scan. In some embodiments, the subpictures are also indexed in the order of raster scan.

As illustrated, the pictures of the sequence 100, e.g., the picture 110, are defined to have four subpictures 210, 220, 230, and 240 that are defined by using the CTU or CTB-based subpicture grids. The indices associated with the subpicture grids are used to specify the sizes and positions of the subpictures 210-240.

In some embodiments, the position of each subpicture is specified based on the index associated with the subpicture grid of a corner of the subpicture (e.g., bottom-right corner or top-left corner). In the figure, the position of the subpicture 210 is index 27, the position of the subpicture 220 is index 36, the position of the subpicture 230 is index 79, and the position of the subpicture 240 is the index 84. In some embodiments, SPS syntax elements such as bottom_right_subpic_grid_idx_delta[i] and subpic_grid_idx_delta_sign_flag[i] are used to specify the bottom-right corner position of one subpicture by referencing the bottom right corner position of another subpicture. Alternatively, in some embodiments, each CTU/CTB-based subpicture grid may be associated with a X-index and a Y-index, and the position of each subpicture may be specified by the X and Y indices of the subpicture grid at the top-left corner of the subpicture.

In some embodiments, the maximum number of subpictures (in a CVS) may be specified in a Video Parameter Set (VPS). Table 3 below is an example syntax table of a VPS that specifies the maximum number of subpictures in a CVS.

TABLE 3

VPS specifying Maximum number of subpictures in a CVS

| | Descriptor |
|---|---|
| Video_parameter_set_rbsp( ) { | |
|   vps_video_parameter_set_id | u(4) |
|   vps_max_layers_minus1 | u(6) |
|   vps_max_subpics_minus2 | u(8) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_dependency_flag[ i ][ j ] | u(1) |
|     } | |
|   } | |
|   if( vps_max_layers_minus1 > 0 ) { | |
|     vps_output_layers_mode | u(2) |
|     if( vps_output_layers_mode = = 2 ) | |
|       for( i = 0; i < vps_max_layers_minus1; i++ ) | |
|         vps_output_layer_flag[ i ] | u(1) |
|   } | |
|   vps_constraint_info_present_flag | u(1) |
|   vps_reserved_zero_7bits | u(7) |
|   if( vps_constraint_info_present_flag ) | |
|     general_constraint_info( ) | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

The syntax element vps_max_subpics_minus2 plus 2 (or vps_max_subpics_minus1 plus 1) specifies the maximum allowed number of subpictures in each CVS referring to the VPS. In some embodiments, the syntax element vps_max_subpics_minus2 is constrained to be in the range of 0 to 254. The value of 255 is reserved for future use.

In some embodiments, subpicture related parameters are signaled in a Picture Parameter Set (PPS). Table 4 below illustrates an example syntax table of a PPS that includes subpicture information.

TABLE 4

PPS specifying Subpicture ID

| | Descriptor |
|---|---|
| pic_parameter_set_rbsp( ) { | |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |

TABLE 4-continued

PPS specifying Subpicture ID

| | Descriptor |
|---|---|
|     conf_win_bottom_offset | ue(v) |
| } | |
| output_flag_present_flag | u(1) |
| single_tile_in_pic_flag | u(1) |
| if( !single_tile_in_pic_flag ) { | |
|     uniform_tile_spacing_flag | u(1) |
|     ... | |
|     loop_filter_across_bricks_enabled_flag | u(1) |
|     if( loop_filter_across_bricks_enabled_flag ) | |
|         loop_filter_across_slices_enabled_flag | u(1) |
| } | |
| if( rect_slice_flag ) { | |
|     signalled_slice_id_flag | u(1) |
|     if( signalled_slice_id_flag ) { | |
|         signalled_slice_id_length_minus1 | ue(v) |
|         for( i = 0; i <= num_slices_in_pic_minus1; i++ ) | |
|             slice_id[ i ] | u(v) |
|     } | |
| } | |
| if(subpics_present_flag ) { | |
|     signalled_subpic_id_flag | u(1) |
|     if( signalled_subpic_id_flag ) { | |
|         signalled_subpic_id_length_minus1 | ue(v) |
|         for( i = 0; i <= num_subpics_minus1; i++ ) | |
|             subpic_id[ i ] | u(v) |
|     } | |
| } | |
| entropy_coding_sync_enabled_flag | u(1) |
| ... | |
| slice_header_extension_present_flag | u(1) |
| pps_extension_flag | u(1) |
| if( pps_extension_flag ) | |
|     while( more_rbsp_data( )) | |
|         pps_extension_data_flag | u(1) |
| rbsp_trailing_bits( ) | |
| } | |

In some embodiments, a syntax element rect_slice_flag in the PPS being 0 specifies that bricks within each slice are in raster scan order and the slice information is not signalled in the PPS. The syntax element rect_slice_flag being 1 specifies that bricks within each slice cover a rectangular region of the picture and the slice information is signalled in the PPS. When subpics_present_flag is equal to 1, the value of rect_slice_flag shall be equal to 1. In some embodiments, when brick_splitting_present_flag is equal to 1, the value of rect_slice_flag is set to 1. When not present, the syntax element rect_slice_flag is inferred to be equal to 1.

The syntax element signalled_subpic_id_flag being 1 specifies that the subpicture ID for each subpicture is signalled. The syntax element signalled_subpic_id_flag being 0 specifies that subpicture IDs are not signalled. When not present, the value of signalled_subpic_id_flag is inferred to be equal to 0.

The syntax element signalled_subpic_id_length_minus1 plus 1 specifies the number of bits used to represent the syntax element subpic_id[i] when present, and the syntax element subpicture_id in slice headers. In some embodiments, the value of signalled_subpic_id_length_minus1 is constrained to be in the range of 0 to 7, inclusive. When not present, the value of signalled_subpic_id_length_minus1 is inferred to be equal to Ceil(Log 2(Max(2, num_subpics_minus1+1)))−1.

The syntax element subpic_id[i] specifies the subpicture ID of the i-th subpicture. The length of the subpic_id[i] syntax element is signalled_subpic_id_length_minus1+1 bits. When not present, the value of subpic_id[i] is inferred to be equal to i, for each i in the range of 0 to num_subpics_minus1, inclusive. The slices with the same subpicture ID collectively form the subpicture region.

The syntax element subpicture_id specifies the subpicture ID to which the current slice belongs. The length of the subpic_id syntax element is Ceil(Log 2(num_subpics_minus1+1)) bits. The value of subpicture_id is a mapping to subpic_id[i] specified in the PPS. The signalled subpicture ID, subpic_id[i], for the i-th subpicture may be added in the PPS and the signalled subpicture ID, subpicture_id, mapping to subpic_id[i] in the PPS, may be added in the slice headers. Table 5 below illustrates an example syntax table of a slice header that includes subpicture information.

TABLE 5

Slice Header specifying Subpicture ID

| | Descriptor |
|---|---|
| slice_header( ) { | |
|     slice_pic_parameter_set_id | ue(v) |
|     if( subpics_present_flag ) | |
|         subpicture_id | u(v) |
|     if( rect_slice_flag || NumBricksInPic > 1 ) | |
|         slice_address | u(v) |
|     if( !rect_slice_flag && !single_brick_per_slice_flag ) | |
|         num_bricks_in_slice_minus1 | ue(v) |
|     non_reference_picture_flag | u(1) |
|     slice_type | ue(v) |
|     ... | |
|     if( slice_header_extension_present_flag ) { | |
|         slice_header_extension_length | ue(v) |
|         for( i = 0; i < slice_header_extension_length; i++) | |
|             slice_header_extension_data_byte[ i ] | u(8) |
|     } | |
|     byte_alignment( ) | |
| } | |

In some embodiments, assuming the subpicture IDs do not change for the CVS, subpicture IDs may be alternatively signaled in slice headers, PPS, and/or SPS of the CVS. For example, the signalled subpicture ID, subpic_id[i], for the i-th subpicture may be signaled in the SPS (rather than the PPS) according to Table 6 below:

TABLE 6

SPS specifying Subpicture ID

| | |
|---|---|
| Seq_parameter_set_rbsp( ) { | |
|     ... | |
|     for( i = 0; i < num_subpics_minus1; i++ ) { | |
|         subpic_id[ i ] | u(v) |
|         subpic_treated_as_pic_flag[ i ] | u(1) |
|         loop_filter_across_subpic_enabled_flag[ i ] | u(1) |
|     } | |
| } | |
| ... | |

II. Example Video Encoder

FIG. 3 illustrates an example video encoder 300 that support subpictures. As illustrated, the video encoder 300 receives input video signal from a video source 305 and encodes the signal into bitstream 395. The video encoder 300 has several components or modules for encoding the signal from the video source 305, at least including some components selected from a transform module 310, a quantization module 311, an inverse quantization module 314, an inverse transform module 315, an intra-picture estimation module 320, an intra-prediction module 325, a motion compensation module 330, a motion estimation module 335, an in-loop filter 345, a reconstructed picture buffer 350, a MV buffer 365, and a MV prediction module 375, and an entropy encoder 390. The motion compensation module 330 and the motion estimation module 335 are part of an inter-prediction module 340.

In some embodiments, the modules 310-390 are modules of software instructions being executed by one or more processing units (e.g., a processor) of a computing device or electronic apparatus. In some embodiments, the modules 310-390 are modules of hardware circuits implemented by one or more integrated circuits (ICs) of an electronic apparatus. Though the modules 310-390 are illustrated as being separate modules, some of the modules can be combined into a single module.

The video source 305 provides a raw video signal that presents pixel data of each video frame without compression. A subtractor 308 computes the difference between the raw video pixel data of the video source 305 and the predicted pixel data 313 from the motion compensation module 330 or intra-prediction module 325. The transform module 310 converts the difference (or the residual pixel data or residual signal 309) into transform coefficients (e.g., by performing Discrete Cosine Transform, or DCT). The quantization module 311 quantizes the transform coefficients into quantized data (or quantized coefficients) 312, which is encoded into the bitstream 395 by the entropy encoder 390.

The inverse quantization module 314 de-quantizes the quantized data (or quantized coefficients) 312 to obtain transform coefficients, and the inverse transform module 315 performs inverse transform on the transform coefficients to produce reconstructed residual 319. The reconstructed residual 319 is added with the predicted pixel data 313 to produce reconstructed pixel data 317. In some embodiments, the reconstructed pixel data 317 is temporarily stored in a line buffer (not illustrated) for intra-picture prediction and spatial MV prediction. The reconstructed pixels are filtered by the in-loop filter 345 and stored in the reconstructed picture buffer 350. In some embodiments, the reconstructed picture buffer 350 is a storage external to the video encoder 300. In some embodiments, the reconstructed picture buffer 350 is a storage internal to the video encoder 300.

The intra-picture estimation module 320 performs intra-prediction based on the reconstructed pixel data 317 to produce intra prediction data. The intra-prediction data is provided to the entropy encoder 390 to be encoded into bitstream 395. The intra-prediction data is also used by the intra-prediction module 325 to produce the predicted pixel data 313.

The motion estimation module 335 performs inter-prediction by producing MVs to reference pixel data of previously decoded frames stored in the reconstructed picture buffer 350. These MVs are provided to the motion compensation module 330 to produce predicted pixel data.

Instead of encoding the complete actual MVs in the bitstream, the video encoder 300 uses MV prediction to generate predicted MVs, and the difference between the MVs used for motion compensation and the predicted MVs is encoded as residual motion data and stored in the bitstream 395.

The MV prediction module 375 generates the predicted MVs based on reference MVs that were generated for encoding previously video frames, i.e., the motion compensation MVs that were used to perform motion compensation. The MV prediction module 375 retrieves reference MVs from previous video frames from the MV buffer 365. The video encoder 300 stores the MVs generated for the current video frame in the MV buffer 365 as reference MVs for generating predicted MVs.

The MV prediction module 375 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 395 by the entropy encoder 390.

The entropy encoder 390 encodes various parameters and data into the bitstream 395 by using entropy-coding techniques such as context-adaptive binary arithmetic coding (CABAC) or Huffman encoding. The entropy encoder 390 encodes various header elements, flags, along with the quantized transform coefficients 312, and the residual motion data as syntax elements into the bitstream 395. The bitstream 395 is in turn stored in a storage device or transmitted to a decoder over a communications medium such as a network.

The in-loop filter 345 performs filtering or smoothing operations on the reconstructed pixel data 317 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 4:
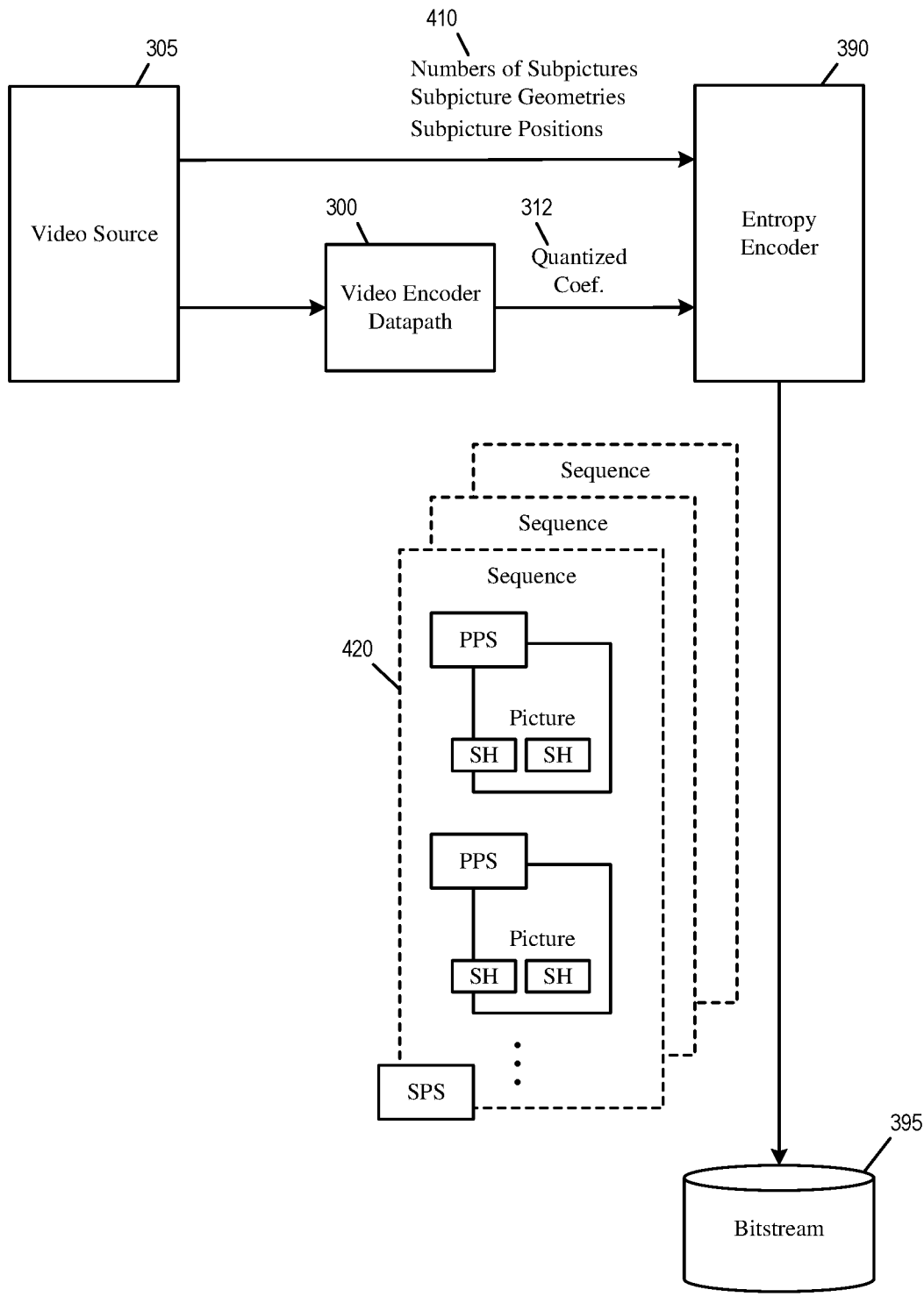
FIG. 4 conceptually illustrates portions of the video encoder that implements signaling for subpictures.

FIG. 4 conceptually illustrates portions of the video encoder 300 that implements signaling for subpictures. As illustrated, the entropy encoder 390 receives signaling from the video source 305, which specifies parameters 410 for subpictures that are to be present in a currently coded sequence 420 of video pictures. These parameters 410 may indicate the number of subpictures that are present in a currently coded sequence. The parameters 410 may also indicate the positions and the geometries (height, width, and size) of each subpicture. The quantized coefficients 312 of the different subpictures are provided to the data path of the encoder 300.

Based on the parameters for the subpictures, the entropy encoder 390 generates syntax elements that serve as specification for the subpictures in the bitstream 395. These syntax elements may include identifiers of subpictures, number of subpictures, as well as subpicture positions and geometries that are specified in terms of CTB/CTU-based subpicture grids. These syntax elements may be stored in the SPS of the currently coded video sequence 420, the PPSs of individual pictures in the video sequence, the slice headers of individual slices in the pictures of the sequence, and/or VPS of the entire video. Examples of these syntax elements are described by reference to Tables 1A-1D and 2-6 above.

Figure 5:
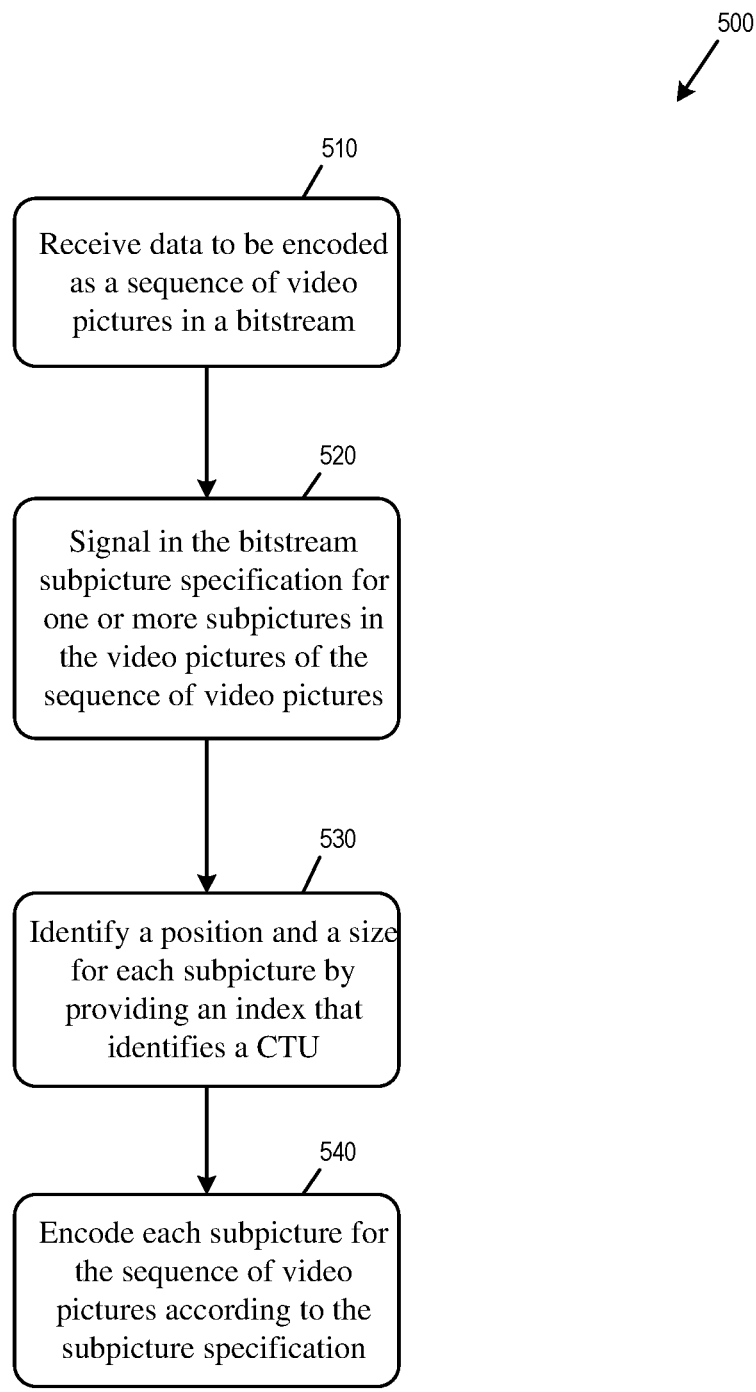
FIG. 5 conceptually illustrates a process for providing subpicture specification at a video encoder.

FIG. 5 conceptually illustrates a process 500 for providing subpicture specification at a video encoder. In some embodiments, one or more processing units (e.g., a processor) of a computing device implements the encoder 300 performs the process 500 by executing instructions stored in a computer readable medium. In some embodiments, an electronic apparatus implementing the decoder 300 performs the process 500.

The encoder receives (at block 510) data to be encoded as a sequence of video pictures in a bitstream. The encoder signals (at block 520) in the bitstream subpicture specification for one or more subpictures in the sequence of video pictures. In some embodiments, a syntax element in a SPS of the sequence of video pictures indicates that one or more subpicture is present in the sequence of video pictures. The SPS may also include a syntax element that specifies the number of subpictures of the sequence of video pictures, as well as an identifier for each subpicture. Identifiers of subpictures may also be signaled in slice headers and/or PPS of video pictures in the sequence of video pictures. In some embodiments, a syntax element in the PPS of a video picture in the sequence of video picture indicates that all slices of the video picture are rectangular.

The encoder identifies (at block 530) a position and a size for each subpicture by providing an index that identifies a CTU for the subpicture 830

In some embodiments, the identified CTU is at a corner (e.g., top-left or bottom-right) of the subpicture. In some embodiments, the index is assigned to a subpicture grid, and different subpicture grids are assigned different indices. In some embodiments, the index identifies a subpicture grid that is defined to be one CTU or correspond to one CTU, such that the boundaries of the subpicture grids are defined along boundaries of CTUs. In some embodiments, the indices of subpicture positions are signaled in a SPS of the sequence of video pictures.

The encoder encodes (at block 540) each subpicture for the sequence of video pictures according to the subpicture specification.

III. Example Video Decoder

Figure 6:
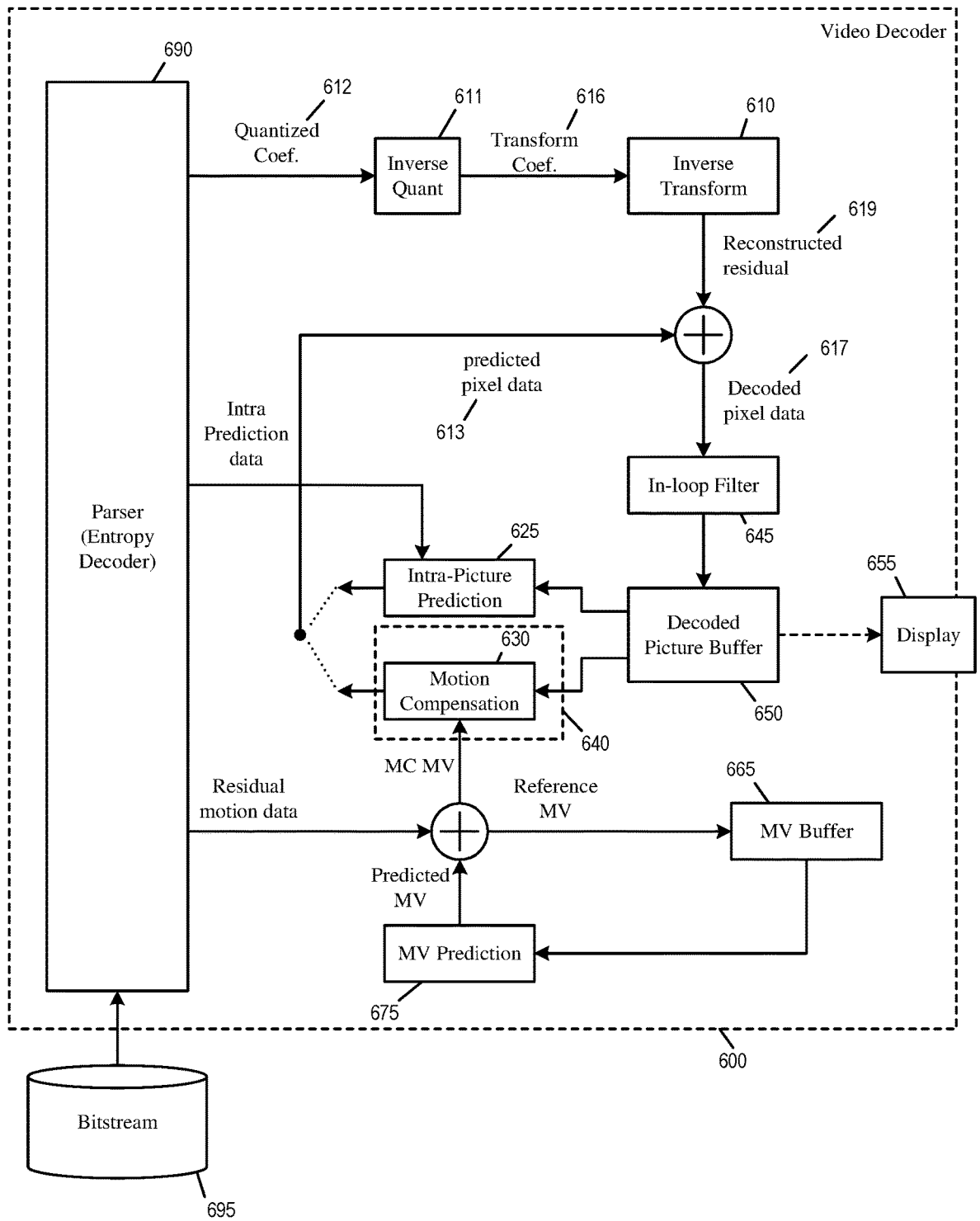
FIG. 6 illustrates an example video decoder that support subpictures.

FIG. 6 illustrates an example video decoder 600 that support subpictures. As illustrated, the video decoder 600 is an image-decoding or video-decoding circuit that receives a bitstream 695 and decodes the content of the bitstream into pixel data of video frames for display. The video decoder 600 has several components or modules for decoding the bitstream 695, including some components selected from an inverse quantization module 611, an inverse transform module 610, an intra-prediction module 625, a motion compensation module 630, an in-loop filter 645, a decoded picture buffer 650, a MV buffer 665, a MV prediction module 675, and a parser 690. The motion compensation module 630 is part of an inter-prediction module 640.

In some embodiments, the modules 610-690 are modules of software instructions being executed by one or more processing units (e.g., a processor) of a computing device. In some embodiments, the modules 610-690 are modules of hardware circuits implemented by one or more ICs of an electronic apparatus. Though the modules 610-690 are illustrated as being separate modules, some of the modules can be combined into a single module.

The parser 690 (or entropy decoder) receives the bitstream 695 and performs initial parsing according to the syntax defined by a video-coding or image-coding standard. The parsed syntax element includes various header elements, flags, as well as quantized data (or quantized coefficients) 612. The parser 690 parses out the various syntax elements by using entropy-coding techniques such as context-adaptive binary arithmetic coding (CABAC) or Huffman encoding.

The inverse quantization module 611 de-quantizes the quantized data (or quantized coefficients) 612 to obtain transform coefficients, and the inverse transform module 610 performs inverse transform on the transform coefficients 616 to produce reconstructed residual signal 619. The reconstructed residual signal 619 is added with predicted pixel data 613 from the intra-prediction module 625 or the motion compensation module 630 to produce decoded pixel data 617. The decoded pixels data are filtered by the in-loop filter 645 and stored in the decoded picture buffer 650. In some embodiments, the decoded picture buffer 650 is a storage external to the video decoder 600. In some embodiments, the decoded picture buffer 650 is a storage internal to the video decoder 600.

The intra-prediction module 625 receives intra-prediction data from bitstream 695 and according to which, produces the predicted pixel data 613 from the decoded pixel data 617 stored in the decoded picture buffer 650. In some embodiments, the decoded pixel data 617 is also stored in a line buffer (not illustrated) for intra-picture prediction and spatial MV prediction.

In some embodiments, the content of the decoded picture buffer 650 is used for display. A display device 655 either retrieves the content of the decoded picture buffer 650 for display directly, or retrieves the content of the decoded picture buffer to a display buffer. In some embodiments, the display device receives pixel values from the decoded picture buffer 650 through a pixel transport.

The motion compensation module 630 produces predicted pixel data 613 from the decoded pixel data 617 stored in the decoded picture buffer 650 according to motion compensation MVs (MC MVs). These motion compensation MVs are decoded by adding the residual motion data received from the bitstream 695 with predicted MVs received from the MV prediction module 675.

The MV prediction module 675 generates the predicted MVs based on reference MVs that were generated for decoding previous video frames, e.g., the motion compensation MVs that were used to perform motion compensation. The MV prediction module 675 retrieves the reference MVs of previous video frames from the MV buffer 665. The video decoder 600 stores the motion compensation MVs generated for decoding the current video frame in the MV buffer 665 as reference MVs for producing predicted MVs.

The in-loop filter 645 performs filtering or smoothing operations on the decoded pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
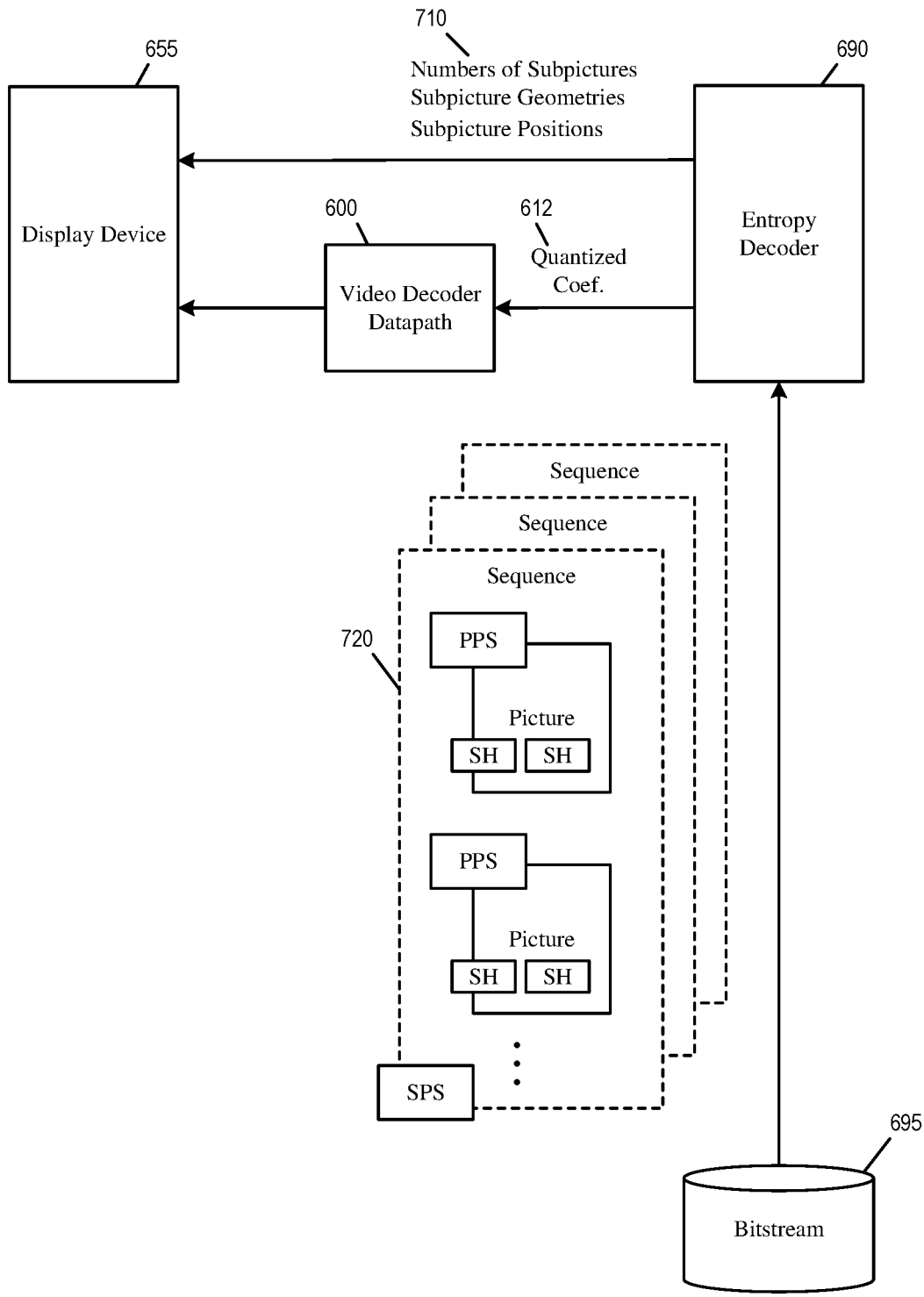
FIG. 7 conceptually illustrates portions of the video decoder that implements signaling for subpictures.

FIG. 7 conceptually illustrates portions of the video decoder 600 that implements signaling for subpictures. As illustrated, the entropy decoder 690 provides quantized coefficients 612 to the data path of the video decoder 600, which in turn generates pixel data to be displayed at the display device 655 for different subpictures. The display device may display the received pixel data according to subpicture parameters 710 for subpictures that are to be present in a currently coded sequence of pictures 720. The parameters 710 may also indicate the number of subpictures that are to be present in the currently coded sequence. These parameters may also indicate the positions and the geometries (size, height, width) of each subpicture. The entropy decoder 690 provide the subpicture parameters based on syntax elements decoded from the bitstream 695.

As illustrated, the entropy decoder (parser) 690 receives syntax elements that serve as specification for the subpictures from the bitstream 695. These syntax elements may include identifiers of subpictures, number of subpictures, as well as subpicture positions and geometries that are specified in terms of CTB/CTU-based subpicture grids. These syntax elements may be stored in the SPS of the currently coded video sequence 720, the PPSs of individual pictures in the video sequence, the slice headers of individual slices in the pictures of the sequence, and/or VPS of the entire video. Examples of these syntax elements are described by reference to Tables 1A-1D and 2-6 above.

Figure 8:
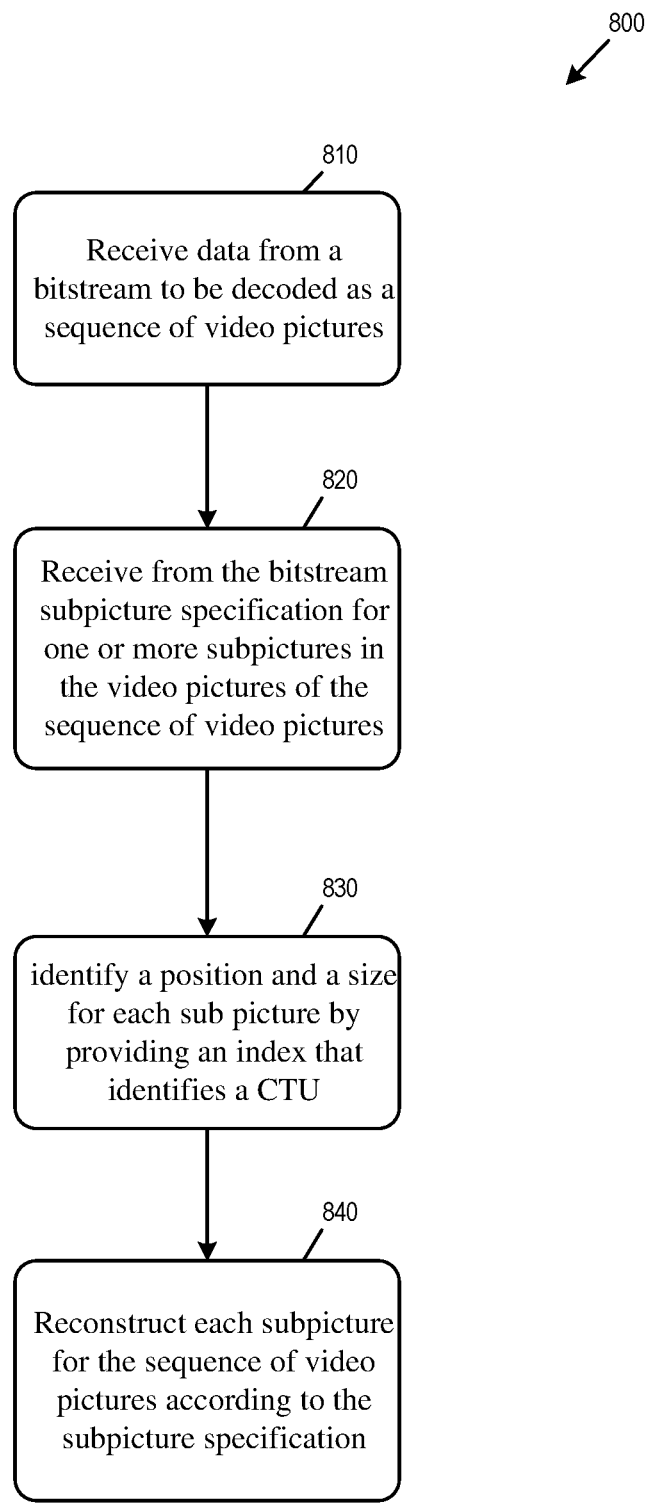
FIG. 8 conceptually illustrates a process for processing subpicture specification at a video decoder.

FIG. 8 conceptually illustrates a process 800 for processing subpicture specification at a video decoder. In some embodiments, one or more processing units (e.g., a processor) of a computing device implements the decoder 600 performs the process 800 by executing instructions stored in a computer readable medium. In some embodiments, an electronic apparatus implementing the decoder 600 performs the process 800.

The decoder receives (at block 810) from a bitstream to be decoded as a sequence of video pictures. The decoder receives (at block 820) from the bitstream subpicture specification for one or more subpictures in the sequence of video pictures. In some embodiments, a syntax element in a SPS of the sequence of video pictures indicates that one or more subpicture is present in the sequence of video pictures. The SPS may also include a syntax element that specifies the number of subpictures of the sequence of video pictures, as well as an identifier for each subpicture. Identifiers of subpictures may also be signaled in slice headers and/or PPS of video pictures in the sequence of video pictures. In some embodiments, a syntax element in the PPS of a video picture in the sequence of video picture indicates that all slices of the video picture are rectangular.

The decoder identifies (at block 830) a position and a size for each subpicture by providing an index that identifies a CTU for the subpicture. In some embodiments, the identified CTU is at a corner (e.g., top-left or bottom-right) of the subpicture. In some embodiments, the index is assigned to a subpicture grid, and different subpicture grids are assigned different indices. In some embodiments, the index identifies a subpicture grid that is defined to be one CTU or correspond to one CTU, such that the boundaries of the subpicture grids are defined along boundaries of CTUs. In some embodiments, the indices of subpicture positions are signaled in a SPS of the sequence of video pictures.

The decoder reconstructs (at block 840) each subpicture for the sequence of video pictures according to the subpicture specification.

IV. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 9:
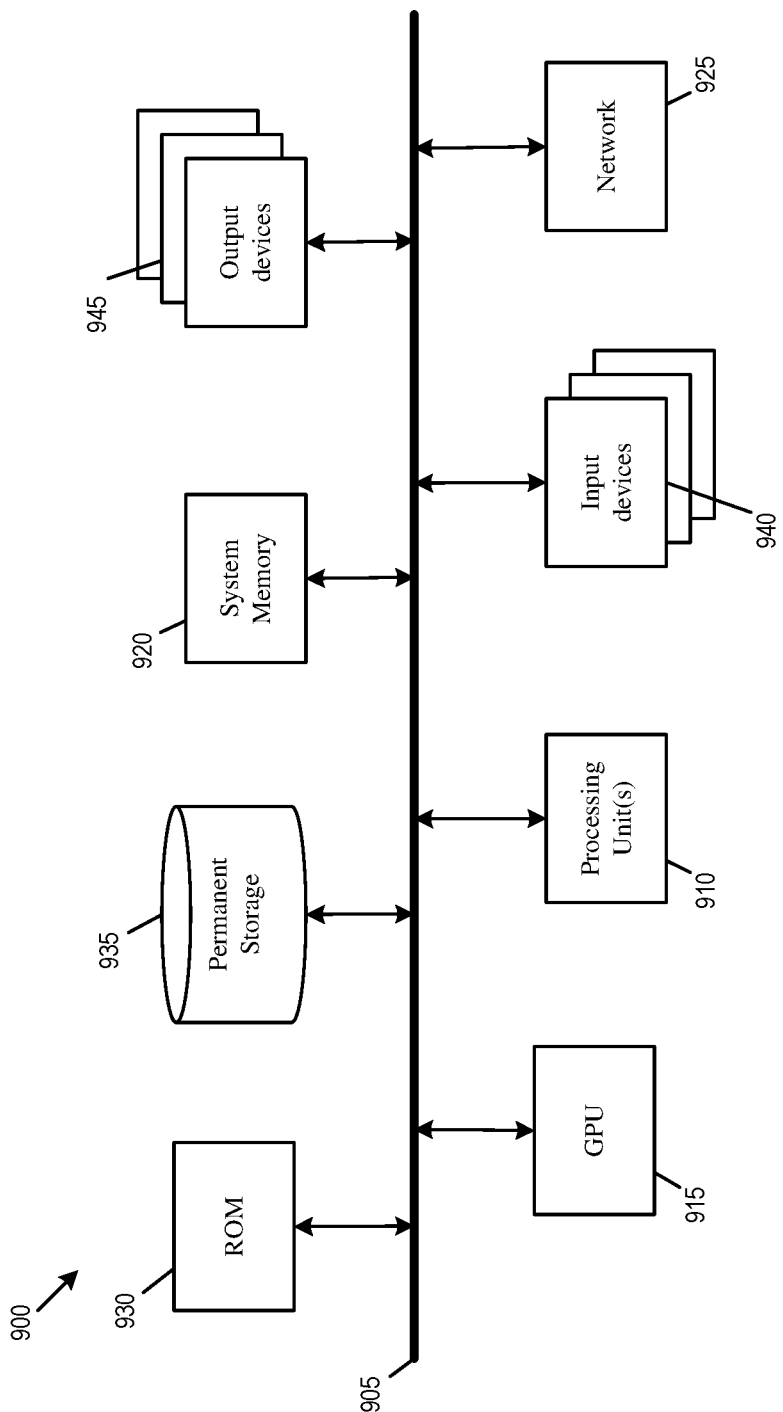
FIG. 9 conceptually illustrates an electronic system with which some embodiments of the present disclosure are implemented.

FIG. 9 conceptually illustrates an electronic system 900 with which some embodiments of the present disclosure are implemented. The electronic system 900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 900 includes a bus 905, processing unit(s) 910, a graphics-processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the GPU 915, the read-only memory 930, the system memory 920, and the permanent storage device 935.

From these various memory units, the processing unit(s) 910 retrieves instructions to execute and data to process in order to execute the processes of the present disclosure. The processing unit(s) may be a single processor or a multi-core processor in different embodiments. Some instructions are passed to and executed by the GPU 915. The GPU 915 can offload various computations or complement the image processing provided by the processing unit(s) 910.

The read-only-memory (ROM) 930 stores static data and instructions that are used by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the present disclosure use a mass-storage device (such as a magnetic or optical disk and its corresponding disk drive) as the permanent storage device 935.

Other embodiments use a removable storage device (such as a floppy disk, flash memory device, etc., and its corresponding disk drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor uses at runtime. In some embodiments, processes in accordance with the present disclosure are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 5 and FIG. 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations.

Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
receiving data from a bitstream to be decoded as a sequence of video pictures;
receiving, from the bitstream, subpicture specification for one or more subpictures in the sequence of video pictures, the subpicture specification identifying a position and a size for each subpicture of the one or more subpictures by providing an index that identifies a coding tree unit (CTU) for the respective subpicture; and
reconstructing each subpicture of the one or more subpictures for the sequence of video pictures according to the subpicture specification,
wherein a syntax element in a sequence parameter set (SPS) of the sequence of video pictures indicates that one or more subpictures are present in the sequence of video pictures, and
wherein a syntax element in a picture parameter set (PPS) of a video picture in the sequence of video pictures indicates that all slices of the video picture are rectangular.

2. The method of claim 1, wherein different CTUs correspond to different subpicture grids that are assigned different indices.

3. The method of claim 2, wherein boundaries of the subpicture grids are defined using boundaries of CTUs.

4. The method of claim 1, wherein the CTU identified by the provided index is at a corner of the subpicture.

5. The method of claim 1, wherein the index is provided by the SPS of the sequence of video pictures.

6. The method of claim 5, wherein the syntax element in the SPS specifies a number of subpictures of the sequence of video pictures.

7. The method of claim 5, wherein an identifier for the subpicture is signaled in the SPS.

8. The method of claim 1, wherein an identifier for the subpicture is signaled in a slice header of a slice.

9. The method of claim 1, wherein an identifier for the subpicture is signaled in the PPS of a video picture in the sequence of video pictures.

10. A video encoding method, comprising:
receiving data to be encoded as a sequence of video pictures in a bitstream;
signaling, in the bitstream, subpicture specification for one or more subpictures in the sequence of video pictures, the subpicture specification identifying a position and a size for each subpicture of the one or more subpictures by providing an index that identifies a coding tree unit (CTU) for the respective subpicture; and
encoding each subpicture of the one or more subpictures for the sequence of video pictures according to the subpicture specification,
wherein a syntax element in a sequence parameter set (SPS) of the sequence of video pictures indicates that one or more subpictures are present in the sequence of video pictures, and
wherein a syntax element in a picture parameter set (PPS) of a video picture in the sequence of video pictures indicates that all slices of the video picture are rectangular.

11. An electronic apparatus, comprising:
a video decoder circuit configured to perform operations comprising:
receiving data from a bitstream to be decoded as a sequence of video pictures;
receiving, from the bitstream, subpicture specification for one or more subpictures in the sequence of video pictures, the subpicture specification identifying a position and a size for each subpicture of the one or more subpictures by providing an index that identifies a coding tree unit (CTU) for the respective subpicture; and
reconstructing each subpicture of the one or more subpictures for the sequence of video pictures according to the subpicture specification,
wherein a syntax element in a sequence parameter set (SPS) of the sequence of video pictures indicates that one or more subpictures are present in the sequence of video pictures, and
wherein a syntax element in a picture parameter set (PPS) of a video picture in the sequence of video pictures indicates that all slices of the video picture are rectangular.

* * * * *